(12) United States Patent
Fisher

(10) Patent No.: US 7,653,269 B1
(45) Date of Patent: Jan. 26, 2010

(54) QUASI PM FUSED COUPLER DEVICES AND METHODS FOR FORMING THE SAME

(75) Inventor: Norman Edward Fisher, Torquay (GB)

(73) Assignee: Gooch & Housego PLC, Somerset (GB)

( * ) Notice: Subject to any disclaimer, the term of this patent is extended or adjusted under 35 U.S.C. 154(b) by 0 days.

(21) Appl. No.: 12/270,062

(22) Filed: Nov. 13, 2008

(51) Int. Cl.
*G02B 6/00* (2006.01)
*G02B 6/26* (2006.01)

(52) U.S. Cl. .............................. 385/11; 385/39; 385/50

(58) Field of Classification Search ........................ None
See application file for complete search history.

(56) References Cited

U.S. PATENT DOCUMENTS

| 4,673,244 | A | * | 6/1987 | Miles | ............................ | 385/38 |
| 5,420,949 | A | * | 5/1995 | Arima et al. | .................... | 385/43 |
| 6,701,046 | B1 | * | 3/2004 | Pianciola et al. | .............. | 385/43 |

FOREIGN PATENT DOCUMENTS

| GB | 2372579 | 8/2002 |

* cited by examiner

*Primary Examiner*—Omar Rojas
(74) *Attorney, Agent, or Firm*—Patents on Demand, P.A.; Neil R. Jetter

(57) ABSTRACT

A quasi-PM fused optical coupler device and method for forming the same. The optical coupler device includes a first polarization maintaining (PM) input section providing a first PM input for the fused optical coupler device for receiving a linearly polarized signal and a first PM input section output. A non-PM fiber including fusion region has an input optically coupled to the first PM input section output, the fusion region including a fusion region output. A first intermediate non-PM output and a second intermediate non-PM output are both optically coupled to the fusion region output. A first support structure is provided for securing the fusion region thereto, wherein the first intermediate non-PM output includes a cleaved output near an outer edge of the first support structure to provide a shortened first intermediate non-PM output. A first PM pigtail section has a first PM input optically coupled to the shortened first intermediate non-PM output and an output that provides a first device output for the fused optical coupler device. The first PM pigtail is rotationally aligned to said shortened first intermediate non-PM output to provide a polarization extinction ratio (PER) measured at the first device output of $\geq 20$ dB.

20 Claims, 6 Drawing Sheets

QUASI PM FUSED COUPLER DEVICES AND METHODS FOR FORMING THE SAME

FIELD

This invention relates to polarization-maintaining (PM) fused optical couplers, more particularly to PM fused optical couplers utilizing PM and non-PM optical fibers and polarization-insensitive coupling, and to methods of using and manufacturing such PM fused optical couplers.

BACKGROUND

The use of linearly polarized light is important to modern telecommunication systems and other fiber-optic applications. The efficiency with which such polarization is maintained can be defined and measured using, for example, a polarimeter or more commonly a polarization extinction ratio (PER) meter.

In fiber optics, a PM optical fiber is an optical fiber with intrinsic birefringence in which the polarization of linearly-polarized light properly launched into the fiber is maintained. Known PM fibers may be of various types, such as Panda™, bow-tie (Tiger) type, varying in the shape of so-called stress rods, or tensioning members (e.g. regions of different glass composition in the fiber cladding). Also known are PM fibers that have an elliptical core shape. The intrinsic birefringence of PM fiber creates two orthogonal polarization axes, referred to as the fast axis and the slow axis. The propagation of linearly polarized light with its polarization properly aligned with these axes (i) is faster if the alignment is with the fast axis and (ii) exhibits minimal cross-coupling (i.e. transfer) of optical power to the other axis. The output PER of such fiber is generally high (typically >30 dB), whether the polarization is aligned with the fast or slow PM axis.

As known in the art, fabricating fused couplers from glass fibers generally involves (i) bringing into intimate contact two or more such fibers under a twisted or parallel arrangement, (ii) fusing the aligned region under heat to form a single waist, and (iii) drawing such a waist until the desired coupling characteristics are attained.

Fused couplers were originally made from non-PM glass fibers. Such couplers generally provide polarization-insensitive coupling but generally do not preserve polarization. Fused couplers have also been made from glass PM fibers. While such couplers can preserve polarization to generally provide an output PER of greater than 20 dB, their coupling characteristics are generally highly polarization dependent.

To fabricate a fused coupler offering both polarization preservation and polarization-insensitive coupling generally requires a concatenated fiber approach in which the fused coupling region involves non-PM fiber, and the input and output regions involve PM fiber. A key requirement for this concatenated fiber approach is for the non-PM fiber portions to be sufficiently short to prevent depolarization. This approach comprises first assembling PM to non-PM to PM concatenated fibers, and then using either a twisted or parallel arrangement of the non-PM portions to form the fused coupling region. Polarization is preserved by pre-aligning the axes of the PM fiber portions with the plane of the coupler to be formed. However, such alignment can tend to add to and thus increase any twist or stress present in the non-PM fibre. Such increased twist or stress may cause either (i) separation of the non-PM fibers during formation of the fused coupling region or (ii) induction of circular or linear birefringence which can rotate or otherwise degrade the input linear polarization state. Hence, the concatenated fiber approach is difficult to implement and thus may not address the requisite issues of manufacturability and reliability, nor provide any means to compensate polarization changes inadvertently introduced within the fused coupling region. Accordingly, a new concatenated fiber approach is needed for manufacturing more reliable fused fiber couplers with polarization-insensitive coupling and which preserve polarization to a consistently high PER of about 20 dB or more.

SUMMARY

This Summary is provided to comply with 37 C.F.R. § 1.73, presenting a summary of the invention to briefly indicate the nature and substance of the invention. It is submitted with the understanding that it will not be used to interpret or limit the scope or meaning of the claims.

Embodiments of the invention include a method of forming quasi-PM fused optical coupler devices having at least one PM output and fused coupler devices therefrom. The fused optical coupler devices have at least one PM input, a non-PM fused region, and at least one PM output. Other inputs and outputs can be PM or non-PM, subject to the aggregate of all inputs and outputs being at least three. Although generally described herein as having no more than 2 inputs and no more than 2 outputs, those having ordinary skill in the art will realize embodiments of the invention can be extended to 3 or more inputs, and/or 3 or more outputs simply by adding additional fiber(s) to the processing described herein.

The fused optical coupler device is fabricated using post-fused region formation techniques that result in a high output PER, such as at least 20 dB. While the non-PM fused region provides polarization-insensitive coupling, polarization in the PM output(s) is generally maintained by a PM fiber pigtail that is rotationally aligned by maximizing the PER before its splicing to the device, thus canceling most of the circular birefringence introduced in the non-PM regions which would otherwise rotate a propagating linear polarization state that would otherwise significantly lower the PER.

A first fiber comprising a non-PM fiber portion and a second non-PM fiber are provided, such as from single mode (SM) fibers. A length of the non-PM fiber portion is fused to the second non-PM fiber to form an intermediate device having a fusion region, and a first non-PM output and a second non-PM output. A first PM fiber portion is joined to an input of the non-PM fiber portion, either before or after forming the intermediate device. The fusion region of the intermediate device is secured to a first support structure to form a secured intermediate device having the first non-PM output. The first non-PM output is cleaved near an outer edge of the first support structure to shorten the first non-PM output to form a shortened first non-PM output.

An input of a first PM pigtail having a first PM output is optically coupled to the shortened first non-PM output and a linearly polarized test signal is launched into an axis of the first PM fiber portion. An output PER is measured at the first PM output. The first PM pigtail is rotated to identify a first rotational alignment based on the measured PER to maximize the PER. The first PM pigtail is then spliced to the shortened first non-PM output aligned using the first rotational alignment, wherein an output of the first PM pigtail provides the first PM device output. Fusion is generally accomplished using fusion splicing for enhanced mechanical stability. However, mechanical splicing is also possible, but may lead to reduced mechanical stability. The secured intermediate device and the first PM pigtail are then bonded to a second support structure.

Besides the rotational alignment described above, high PER is provided by fused optical coupler devices according to embodiments of the invention by cleaving the non-PM outputs near the edge of first support structure to reduce the length over which such polarization dependent influences operate. In a typical embodiment, "near" corresponds to about 1 or 2 cm beyond the edge of the first support structure. The Present Inventors have found that such distances combined with a typical fusion-region length (a few cm) are generally sufficient to prevent significant measurable depolarization.

Particular advantages relating to embodiments of the invention comprise generally:

i) Polarization-insensitive coupling. The fused fiber coupler will exhibit similar coupling ratios independent of launch polarization. This feature is useful to provide a stable power-monitoring output should the polarization or PER at the input to the fused fiber coupler change with time.

ii) Embodiments of the invention are sufficiently versatile to generally accommodate a twisted arrangement of the non-PM fibers prior to fusion. It is thus possible to fuse pre-tapered or otherwise dissimilar non-PM fibers to produce wavelength-flattened devices. Such production using conventional methods would be very difficult if the non-PM fibers were in a parallel arrangement prior to fusion, or if they were replaced with PM fibers.

iii) As in other parts of the spectrum, embodiments of the invention are equally suitable for use in visible (RGB) applications, a spectral region where it is notably difficult to obtain PM fibers suitable for forming into the fusion region of a viable coupler.

As used herein, the terms "fusion region" and "fused coupling region" are synonymous and are defined to include the following:

a) the long thinned (elongated) coalesced strand at the center of the fusion region;

b) at each end of the strand, a fused region tapering to larger diameter from which emerges two or more non-PM fiber portions; and c) an up-taper region over which the emergent non-PM fiber portions taper toward to the original non-PM fiber diameter.

DETAILED DESCRIPTION

Figure 1:
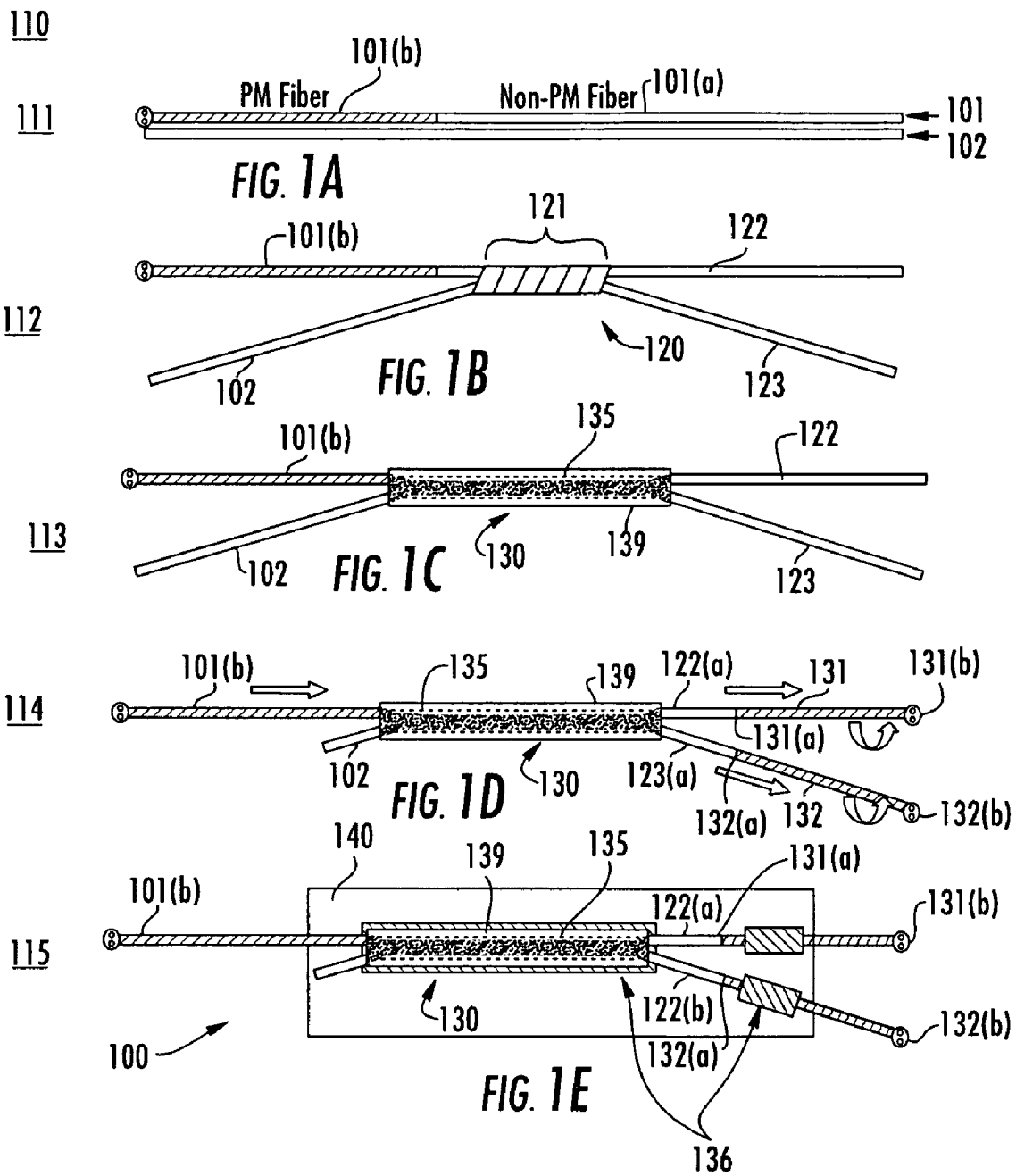
FIGS. 1A-E show a series of intermediate processing steps along with respective depictions for an exemplary method of forming a 1×2 port fused quasi PM optical coupler device having a first PM device output and a second device output, according to an embodiment of the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Referring to FIGS. 1A-E, a series of intermediate processing steps along with respective depictions A-E are shown for an exemplary method 110 of forming a 1×2 port quasi PM fused optical coupler device 100 having a first PM device output 131(b) and a second device output 132(b) shown as a PM output, according to an embodiment of the invention. In step 111, as shown in FIG. 1A, a first fiber 101 comprising a non-PM fiber portion 101(a) spliced to a PM fiber portion 101(b), and a second non-PM fiber 102 are provided and are brought close together, typically by mounting the respective fibers 101 and 102 on a fusion rig (not shown). It is noted that the splice between the PM fiber portion 101(b) and the non-PM fiber portion 101(a) can be arbitrary and involve no effort to rotationally align. Moreover, although the first fiber 101 is shown comprising a non-PM fiber portion 101(a) spliced to a PM fiber portion 101(b), the first fiber 101 at step 111 can consist only of the non-PM fiber portion 101(a). In this arrangement, the PM fiber portion 101(b) can be spliced to the non-PM fiber portion 101(a) after fusing in step 112 described below.

In step 112, as shown in FIG. 1B, a length of the non-PM portion of the first fiber 101(a) is fused to a length of the second fiber 102 generally using standard non-PM techniques. As a result, the respective fibers are twisted and fused using conventional techniques to form a splitter with any required split ratio. Alternatively, parallel fusing or other available fusing techniques may also be used. The intermediate device 120 formed comprises a fusion region 121 and includes a first non-PM output 122 and a second non-PM output 123 (second non-PM output 123 being the portion of fiber 102 on the output side of the fusion region 121). In step 113, the fusion region 121 of the intermediate device 120 is secured typically using an adhesive to a first support structure 135 to form a mechanically stable secured intermediate device 130 that comprises the first support structure 135 supporting the fusion region 121 and the first and second non-PM outputs 122 and 123. The first support structure 135 can comprise a slab or a U-shaped piece of silica or other material of similar mechanical rigidity and thermal expansion characteristics similar to the fiber material. As shown in FIG. 1C, the fusion region of the secured intermediate device 130 along with first support structure 135 are positioned inside and bonded to a housing such as a tube 139, for example, a stainless steel tube, that has sealable ends (e.g. end plugs) for providing a hermetic seal. The sealable ends such as end plugs provide protection against environmental humidity and contamination (e.g. dust). The housing 139 is generally configured so that the inputs and outputs of the device emerge through end-plugs to the outside world.

It is noted that housing 139 provides convenient protection at this stage of the assembly, but is an optional feature for embodiments of the invention since environmental sealing can be provided later in the process as described below.

In step 114 shown in FIG. 1D, the first non-PM output 122 is cleaved as near as possible to an outer edge of the first support structure 139 (e.g. housing) to shorten the first non-PM output 122 to form a shortened first non-PM output 122($a$). An input 131($a$) of a first PM pigtail 131 having a first PM output 131($b$) is axially aligned (but not spliced or otherwise permanently secured) to the shortened first non-PM output 122($a$). PM pigtail 131 is generally held in place within a fusion-splicer machine. Also shown is the second non-PM output 123 cleaved near an outer edge of the first support structure 139 (e.g. housing) to shorten the second non-PM output 123 to form a shortened second non-PM output 123($a$), wherein an input 132($a$) of a second PM pigtail 132 having a second PM output 132($b$) is axially aligned (but not spliced) to the shortened first non-PM output 123($a$). Note that pigtail 132 is also generally held in place within a fusion splicer machine, though not necessarily at the same time as PM pigtail 131. The input side of second fiber 102 is also shown optionally cleaved off since the device to be formed that is being described is a 1×2 port fused optical coupler.

A linearly polarized test signal is then launched into an axis of the PM fiber portion 101($b$). The test signal can be launched into either the fast or slow axis of the first PM fiber portion 101($b$). The first and second PM pigtails 131 and 132 are individually rotated (see curved arrows in FIG. 1D) while the PER is being measured by a suitable PER meter at either axis (fast or slow) at the respective PM outputs 131($b$) and 132($b$). Respective first and second rotational alignments are thus identified that maximize the PER at the respective outputs.

High PERs, such as in the range of 20 to 25 dB or more, indicate that the linear polarization state propagating through the non-PM regions is well aligned with a polarization axis of the respective PM pigtails 131 and 132. The respective PM pigtails 131 and 132 are then spliced to the respective shortened first and second non-PM outputs 122($a$) and 123($a$) using the first and second rotational alignment. In this way, the individual rotations of the PM pigtails 131 and 132 can compensate for circular birefringence, which may rotate the linear state in the non-PM regions and result in significant PER degradation. The outputs of the respective PM pigtails 131($b$) and 132($b$) provide the first and second PM device outputs for the 1×2 port fused coupler device 100.

In step 115 shown in FIG. 1E, the secured intermediate device 130 and the first and second PM pigtails 131 and 132 are secured at positions 136, such as using an adhesive, to a second support structure 140, such as a slab of silica, such that securing positions 136 and second support structure 140 are mechanically stable. Use of a secured intermediate device (e.g. packaged device) 130 and secured output PM pigtails 131 and 132 ensures little or no twist in the non-PM regions of the outputs 122($a$) and 123($a$) which would induce circular birefringence there and hence arbitrarily rotate the propagating linear polarization state and result in a reduced obtainable PER. For environmental protection, applying an outer sealed housing (not shown) to device 100 can be added, and is generally recommended, if the secured intermediate device 130 is assembled without a sealed housing 139 in step 113 described above.

Method 110 has several significant manufacturing advantages over conventional methods. Steps 111-113 shown depicted in FIGS. 1A-C are largely conventional versatile twisting techniques that are especially amenable for wavelength-flattened devices where different diameter or pre-tapered fibers may be used. A major advantage for methods according to embodiments of the invention occurs in the rotational alignments and splicing of PM outputs that takes place post packaging as described in steps 114 (FIG. 1D) and 115 (FIG. 1E). Using this technique the residual circular birefringence "frozen" in the non-PM regions, which would rotate a propagating linear polarization state, can be compensated for by suitable rotations of the PM pigtails 131 and 132. It is noted that guaranteeing no birefringence in the non-PM regions pre-fusion and generated during fusion is generally not available using known fabrication techniques.

There are many possible related variants to method 110 and device 100. For example, in a first variant, the device can initially be a 2×2 port device with all non-PM ports. In this embodiment, fiber 101 is a continuous non-PM fiber (provided without a PM fiber portion 101($b$)). Following fusion and packaging, a PM fiber portion (e.g. pigtail) is spliced to a shortened non-PM fiber 101 before rotational alignment and splicing of PM pigtails 131 and 132.

In a second variant, the fused coupler device can be a 2×2 port device. In this embodiment, a PM fiber is spliced with suitable rotational alignment to the cleaved second fiber 102 shown in FIG. 1D. This variant is also applicable to the first variant described above.

In a third variant, various alignments of axes outputs are possible. For example, if input linear state to PM fiber portion 101($b$) is aligned along the slow axis, the PM pigtails 131 and 132 can be spliced either with their slow axis aligned with the input linear state or the slow axis aligned orthogonal to input linear state. This variant is also applicable to the first and second variants described above.

Figure 2:
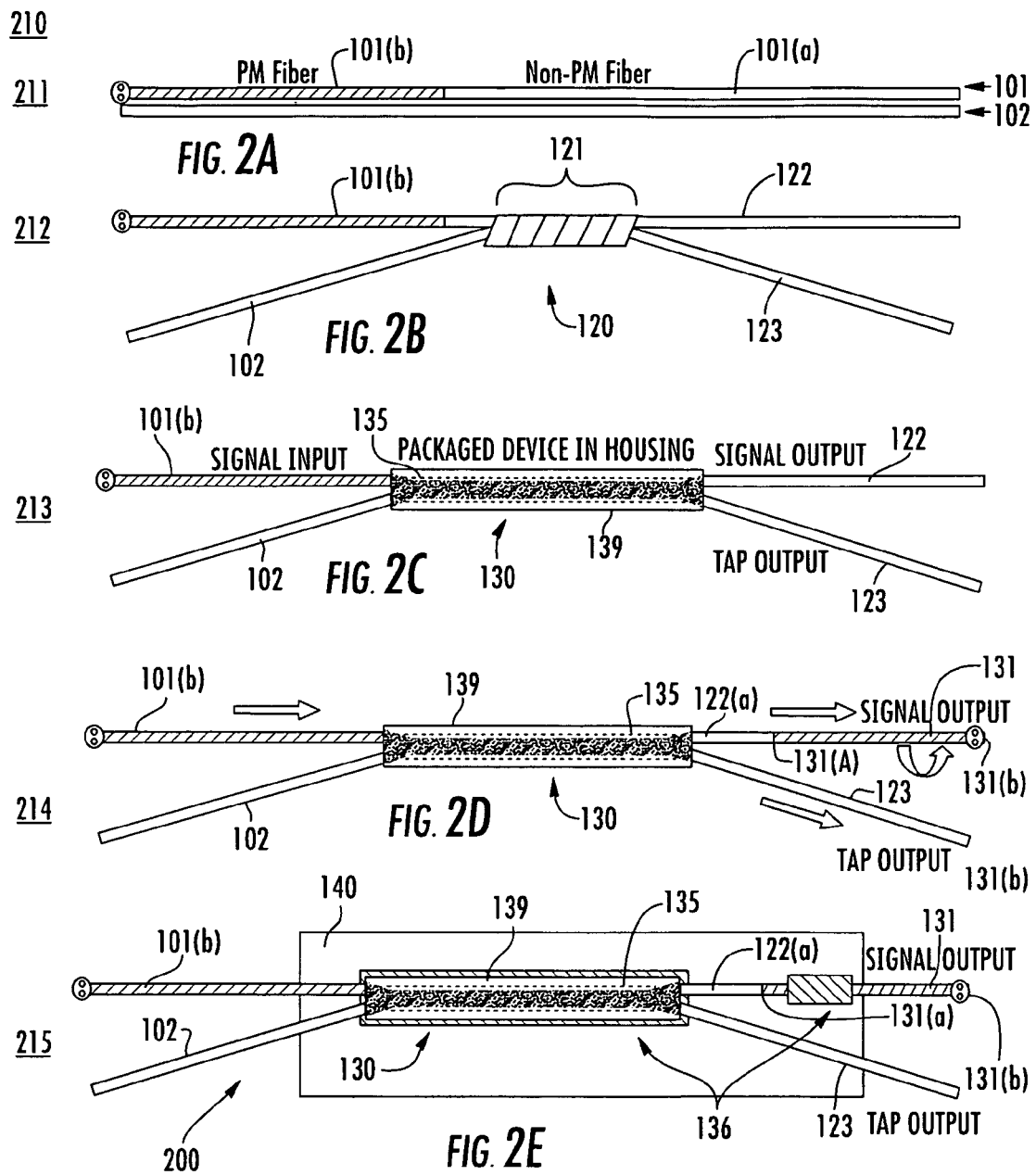
FIGS. 2A-E show a series of intermediate processing steps along with respective depictions 2 for an exemplary method of forming a 1×2 port fused quasi hybrid PM tap coupler device having a first PM device output and a second device output comprising a non-PM tap output, according to an embodiment of the invention.

In a fourth variant, the coupling can be modified. For example, depending on split ratios in fused region 121, devices according to embodiments of the invention can act as PM splitters, combiners, WDMs or include taps (such as described below relative to FIG. 2). This variant is also applicable to the first, second and third variants described above.

In a fifth variant, parallel fusion is used instead of the twisted fusing technique described above in step 112 (FIG. 1B). This variant is also applicable to the first, second, third and fourth variants described above.

Referring to FIGS. 2A-E, a series of intermediate processing steps along with respective depictions are shown for an exemplary method 210 of forming a 1×2 port fused quasi hybrid PM tap coupler device 200 having a first polarization maintaining (PM) device output and a second device output comprising a tap output that provides polarization-insensitive power monitoring, according to an embodiment of the invention. As used herein, a "hybrid" coupler has at least one PM output and at least one non-PM output (as with device 200) and/or at least one PM input and at least one non-PM input (not shown in FIGS. 2A-E). The tap output as known in the art "taps off" a small amount, typically in the range of about 0.1% to 1% of the signal power. Steps 211-213 and corresponding FIGS. 2A-C generally follow steps 111-113 shown in FIGS. 1A-1C described above, except first non-PM output 122 is now identified as the signal output 122 and second non-PM output 123 shown in FIG. 1 is now identified as tap output 123.

In step 214 shown in FIG. 2D, the first non-PM (signal) output 122 is cleaved near an outer edge of the housing 139 (or first support structure 135 in the case of no housing 139) to shorten the first non-PM signal output 122 to form a shortened first non-PM signal output 122(a). A PM pigtail 131 is axially aligned to the first non-PM signal output 122(a). A linearly polarized source is launched into an axis of the PM fiber portion 101(b) which functions as the signal input, and the PM output 131(b) is coupled to a PER meter. The input 131(a) of the PM pigtail 131 is rotated to maximize its output PER in the appropriate axis. The maximum measured PER indicates that the linear polarization state propagating through the non-PM region is well-aligned with the axis of the PM pigtail 131. The input 131(a) of the PM pigtail 131 is then spliced to the shortened first non-PM signal output 122(a). In this way, as with fused coupler 100 described above, the rotational alignment of the PM pigtail 131 compensates for circular birefringence in the non-PM region of fused quasi hybrid PM tap coupler device 200 which would otherwise rotate the linear state.

In step 215 shown in FIG. 2E, the secured intermediate device 130, the PM pigtail 131, and optionally the tap output 123, are secured at positions 136, such as using an adhesive, to a second support structure 140. As described above, this securing operation limits the twist in the non-PM region of the output signal arm which could induce circular birefringence there and hence arbitrarily rotate the propagating linear polarization state and thus reduce PER.

Fused quasi hybrid PM tap coupler devices according to embodiments of the invention can be used in a variety of applications. For example, in many fiberized PM laser systems, the monitoring of output power is required to enable proper system control. Generally, a PM fused coupler device is used in which it is necessary for the signal arm to retain polarization. However, the tap arm, which "taps off" a small amount of the signal power for monitoring need not retain polarization since the measurable of importance is only the intensity, and can be provided by non-PM fiber tap output 123 thus reducing the cost of the device for power monitoring. As with fused coupler device 100 described above, the non-PM input 102 of device 200 may be removed prior to packaging to provide a 1×2 port configured device.

Fused coupler devices having >2×2 port configurations can also be realized using embodiment(s) of the invention. In this case, extra (>2) fibers can be added to the fusing operation so that fusion region combines three or more fibers. Thereafter, various embodiments of the invention can be applied to the extra ports such that, as required, they remain as non-PM fibers, are cleaved, or have spliced-on PM pigtails. In the case of spliced-on PM pigtails inputs to form 3 or more input devices, the PM input pigtails may be aligned by launching the input test signal into one of the outputs of the device (e.g. output 131(b)) and measuring the PER at the PM pigtail input(s).

Figure 3:
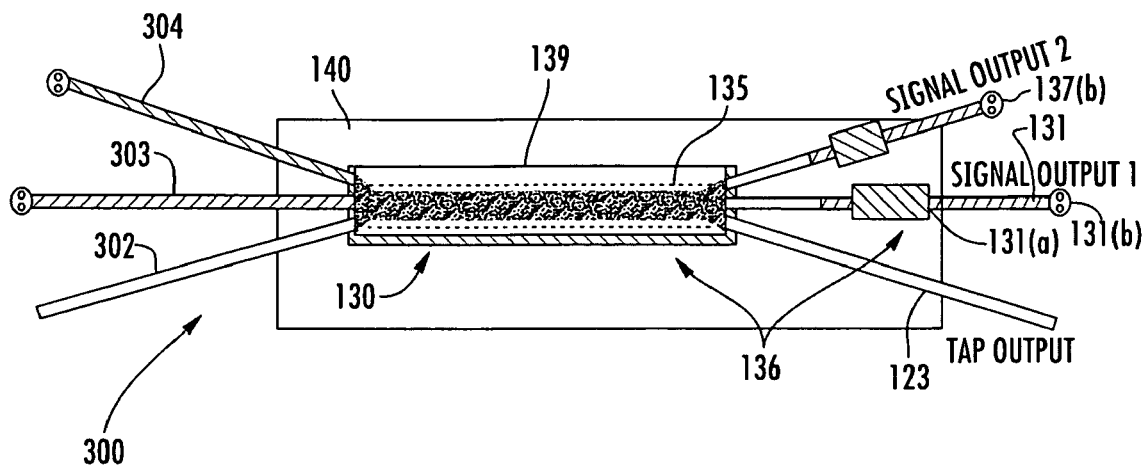
FIG. 3 shows an exemplary fused optical coupler having 3 or more inputs including at least one PM input and 3 or more outputs including at least one PM output, according to an embodiment on the invention.

FIG. 3 shows an exemplary hybrid fused optical coupler 300 having 3 or more inputs including at least one PM input and 3 or more outputs including at least one PM output, according to an embodiment on the invention. Hybrid fused optical coupler 300 is shown including three inputs 302, 303 and 304, with input 302 being a non-PM input and inputs 303 and 304 being PM inputs. Outputs include first and second PM signal outputs 131(b) and 137(b), and non-PM tap output 123.

In another embodiment of the invention, prepackaged non-PM fused couplers (e.g. commercially available) can be converted to fused couplers having at least one PM input and at least one PM output. This embodiment of the invention comprises fusing at least one PM pigtail to the input of the device and at least one PM pigtail to the output of the device, wherein the rotational alignment of the respective pigtails is based on measurement and maximization of a polarization related parameter (e.g. PER) as described above.

EXAMPLES

The following non-limiting Examples serve to illustrate selected embodiments of the invention. It will be appreciated that variations in proportions and alternatives in elements of the components shown will be apparent to those skilled in the art and are within the scope of embodiments of the present invention.

Figure 4A:
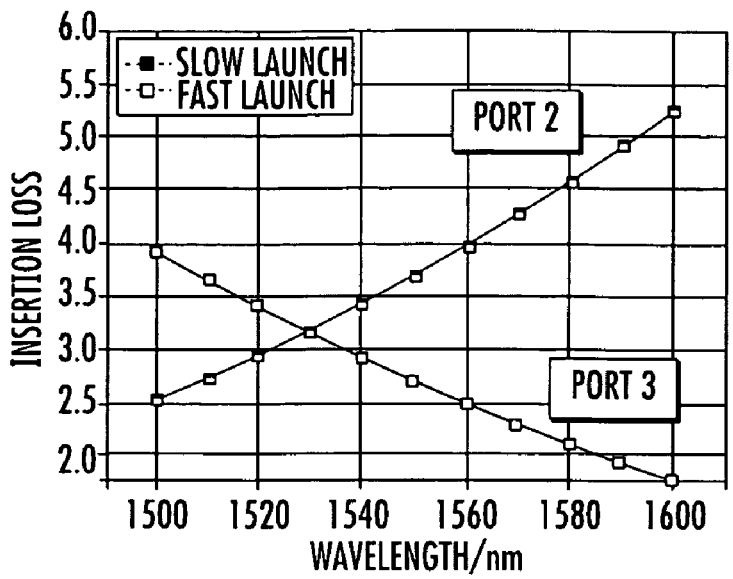
FIGS. 4A-C show spectral data obtained from a 1×2 port device with twisted fusing analogous to fused coupler device shown in FIG. 1C with a 3 dB splitter (at 1530 nm), according to an embodiment of the invention.
Figure 4B:
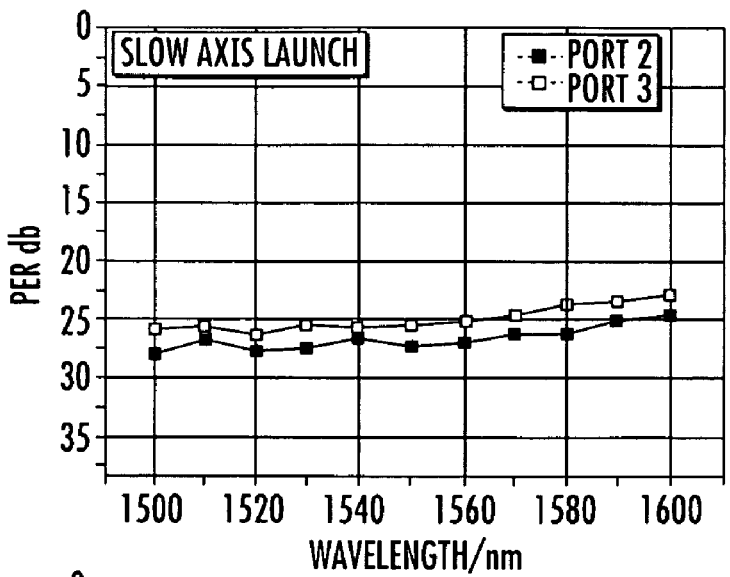
Figure 4C:
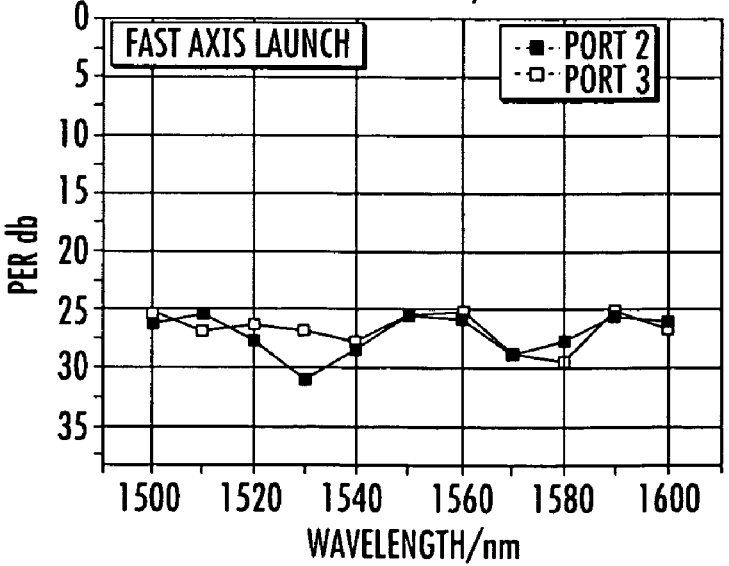

FIGS. 4A-C show measured spectral data obtained from a 1×2 port device fabricated with twisted fusing analogous to fused coupler device 100 shown in FIG. 1E with a 3 dB splitter (at 1530 nm), according to an embodiment of the invention. The slow axis outputs of outputs 131(b) and 132(b) were aligned with the slow axis input of PM fiber portion 101(b). FIG. 4A shows the measured insertion loss at output 131(b) which is shown as port 2 and output 132(b) which is shown as port 3, for both fast axis launch and slow axis launch in the wavelength range from 1500 to 1600 nm. The data sets for the slow axis launch and fast axis launch for each port are so close to one another as to appear superimposed in FIG. 4A. The insertion loss can be seen to be generally 2 to 5 dB, with 3 dB coupling centered at a wavelength of 1530 nm. FIG. 4B shows the measured PER at port 2 and port 3, for slow axis launch in the wavelength range from 1500 to 1600 nm. The PER can be seen to be in the range from 23 to 28 dB. FIG. 4C shows the measured PER at port 2 and port 3, for fast axis launch in the wavelength range from 1500 to 1600 nm. The PER can be seen to generally be in the range from 25 to 30 dB. Spectral data for a fused coupler according to an embodiment of the invention formed using parallel fusing was found to provide very similar performance to the data provided by the fused coupler formed using twisted fusing shown in FIGS. 4A-C.

Figure 5A:
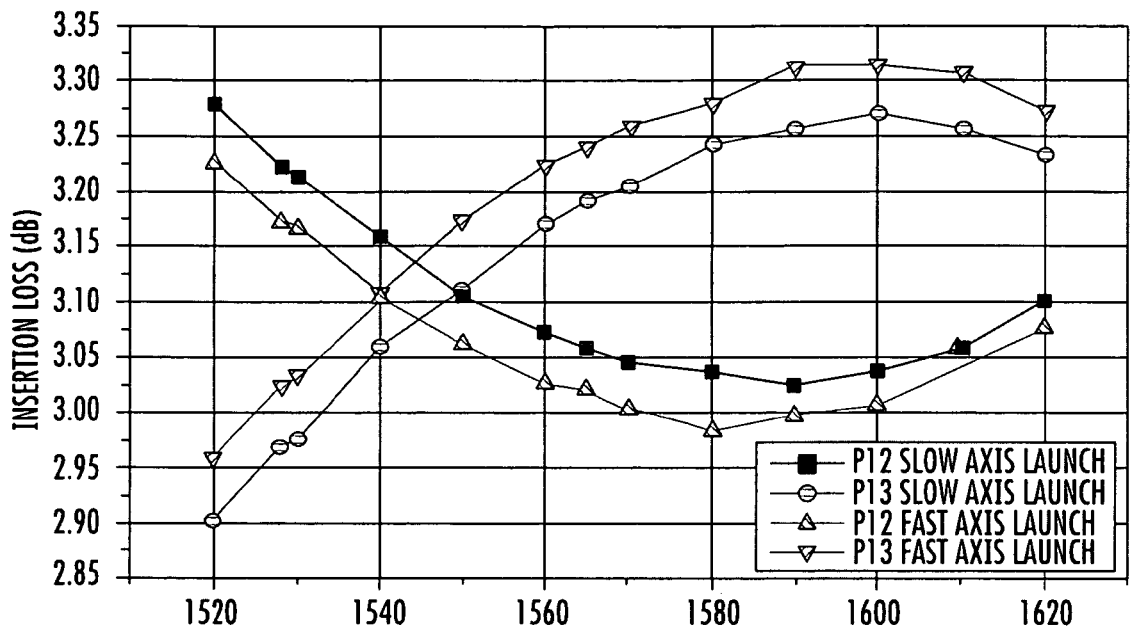
FIGS. 5A-B show spectral data obtained from a 1×2 port wavelength flattened 1550 nm device with twisted fusing analogous to fused coupler device shown in FIG. 1E, according to an embodiment of the invention.
Figure 5B:
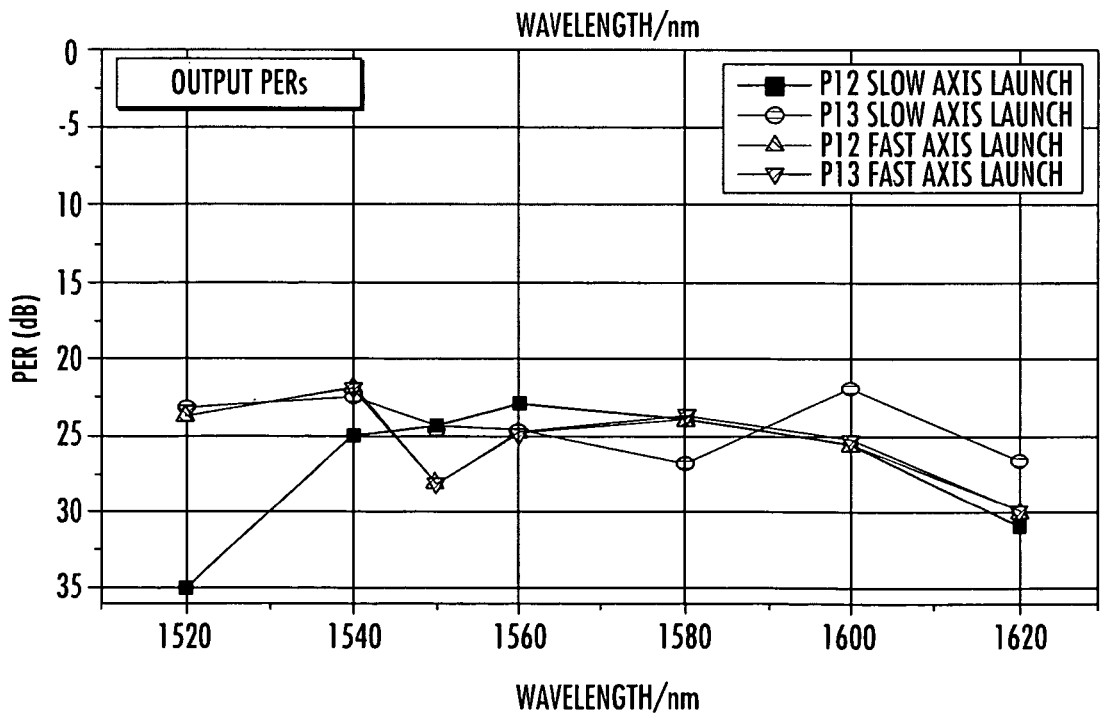

FIGS. 5A-B show spectral data obtained from a 1×2 port wavelength flattened 1550 nm device with twisted fusing analogous to fused coupler device 100 shown in FIG. 1C with a 3 dB splitter (at 1550 nm) according to the first variant described above, according to an embodiment of the invention. The slow axis outputs of outputs 131(b) and 132(b) were aligned with the slow axis input of PM fiber portion 101(b). FIG. 5A shows the measured insertion loss at output 131(b) shown as port 2 and output 132(b) shown as port 3 using the input provided by PM fiber portion 101(b) (shown as port 1) for both fast axis launch and slow axis launch in the wavelength range from 1520 to 1620 nm. Pxy corresponds to the input launched at port x and the output measured at port y, such as $P_{12}$ corresponding to an input launched at port 1 and output measured at port 2. The insertion loss can be seen to be generally 2.9 to 3.3 dB. FIG. 5B shows the measured PER at port 2 and port 3 using input port 1, for both slow axis and fast axis launch in the wavelength range from 1520 to 1620 nm. The PER can be seen to generally be in the range from 23 to 31 dB.

Figure 6A:
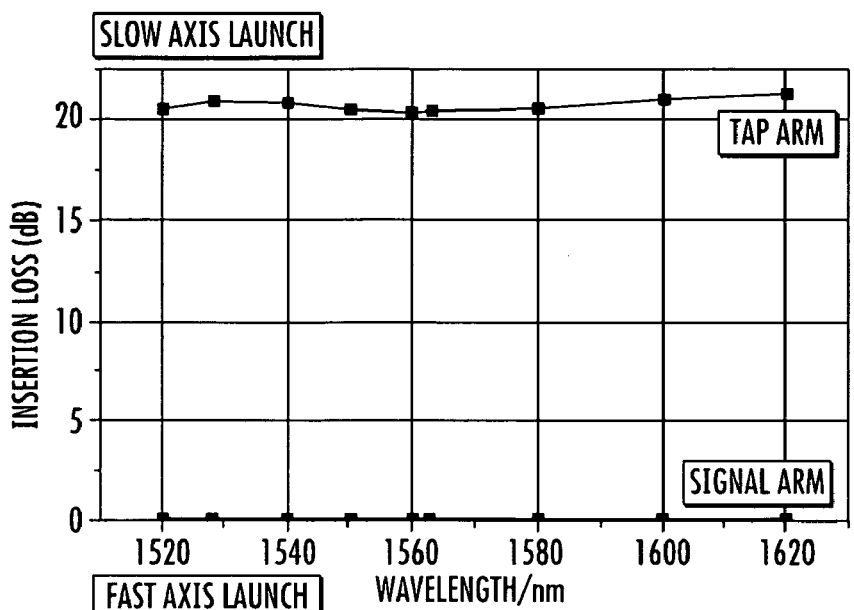
FIGS. 6A-C show spectral data obtained from a 1×2 port fused quasi hybrid PM tap coupler device with twisted fusing analogous to fused coupler device shown in FIG. 2E, according to an embodiment of the invention.
Figure 6B:
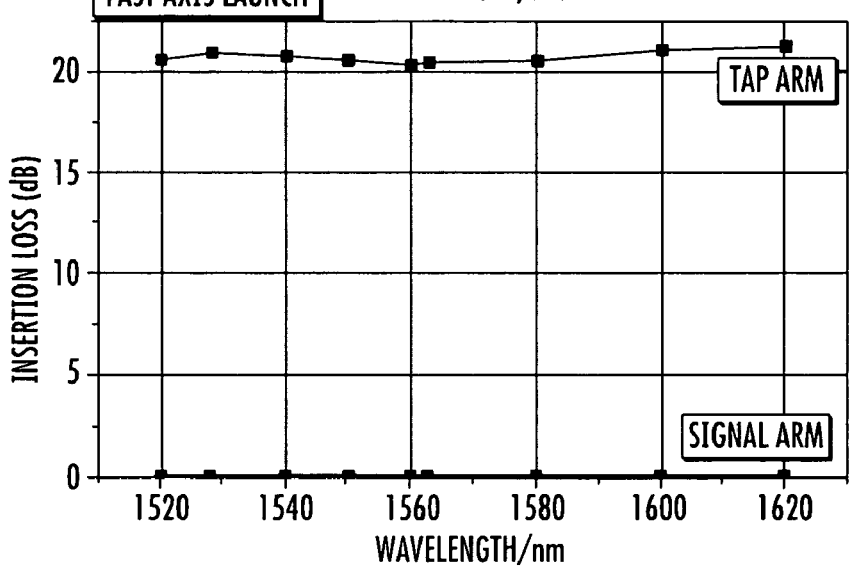
Figure 6C:
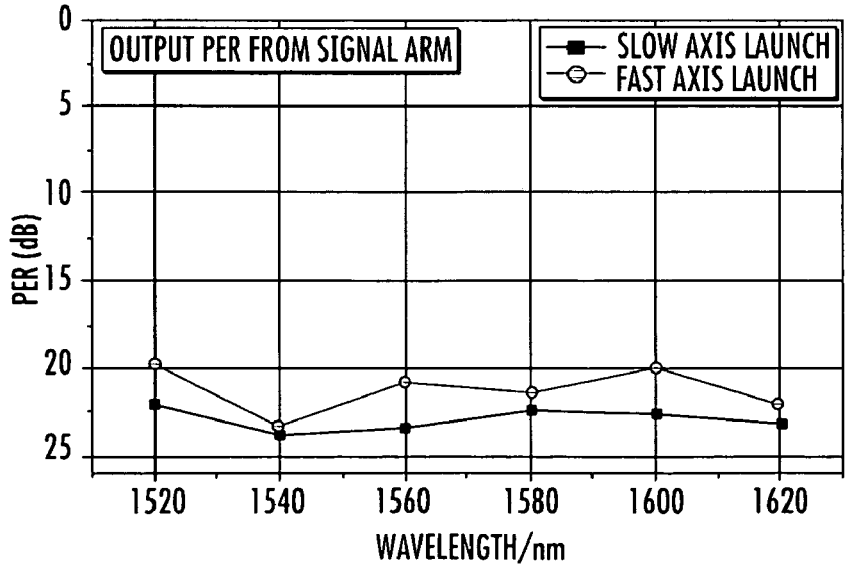

FIGS. 6A-C show spectral data obtained from a 1×2 port fused quasi Hybrid PM 1% tap coupler device 200 with twisted fusing analogous to fused coupler device 200 shown in FIG. 2E, according to an embodiment of the invention. The slow axis output of output 131(b) was aligned with the slow axis input of PM fiber portion 101(b). FIGS. 6A and 6B show the measured insertion loss at the tap arm output 123 and the signal arm output at output 131(b) for slow axis and fast axis launch, respectively, in the wavelength range from 1520 to 1620 nm. The insertion loss for both slow and fast axis launch can be seen to be about 21 to 22 dB for the tap arm output 123 and <1 dB measured at the signal arm output 131(b). FIG. 6C shows the measured PER at the signal arm 131(b), for both slow axis and fast axis launch in the wavelength range from 1520 to 1620 nm. The measured PER can be seen to be in the range from 21 to 25 dB.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the following claims.

I claim:

1. A method of forming a fused optical coupler device having a first polarization maintaining (PM) device output and a second device output, comprising:
providing a first fiber comprising a non-PM fiber portion and a second non-PM fiber;
fusing a length of said non-PM fiber portion to said second non-PM fiber to form an intermediate device having a fusion region and a first non-PM output and a second non-PM output;
joining a first PM fiber portion to an input of said non-PM fiber portion to form an intermediate device;
securing said fusion region of said intermediate device to a first support structure to form a secured intermediate device having said first non-PM output;
cleaving said first non-PM output near an outer edge of said first support structure to shorten said first non-PM output to form a shortened first non-PM output;
optically coupling an input of a first PM pigtail having a first PM output to said shortened first non-PM output;
launching a linearly polarized test signal into an axis of said first PM fiber portion;
measuring a polarization extinction ratio (PER) at said first PM output;
rotating said first PM pigtail to identify a first rotational alignment based on said PER;
splicing said first PM pigtail to said shortened first non-PM output aligned using said first rotational alignment, an output of said first PM pigtail providing said first PM device output, and
bonding said secured intermediate device and said first PM pigtail to a second support structure.

2. The method of claim 1, wherein said joining takes place before said fusing.

3. The method of claim 1, wherein said joining takes place after said fusing.

4. The method of claim 1, wherein said fusing comprises twisting.

5. The method of claim 1, wherein said fusing comprises parallel fusing.

6. The method of claim 1, wherein:
said cleaving also comprises cleaving said second non-PM output near said first support structure to form a shortened second non-PM output;
said measuring comprising measuring said PER with a second PM pigtail optically coupled to said shortened second non-PM output;
said rotating comprising rotating said second PM pigtail to identify a second rotational alignment based on said PER with said second pigtail;
said splicing comprises splicing said second PM pigtail to said shortened second non-PM output using said second rotational alignment, and
said bonding comprises bonding said second PM pigtail to said second support structure.

7. The method of claim 1, wherein said second device output comprises a non-PM output, said second device output being provided by said second non-PM output, wherein said cleaving step does not cleave said second non-PM fiber.

8. The method of claim 1, further comprising joining a second PM fiber portion to an input of said second non-PM fiber.

9. The method of claim 1, wherein said non-PM fiber portion and said second non-PM fiber comprise single mode (SM) fibers.

10. A fused optical coupler device, comprising:
a first polarization maintaining (PM) input section providing at least one input comprising a first PM input for said fused optical coupler device for receiving a linearly polarized signal and a first PM input section output;
a non-PM fiber comprising fusion region having an input optically coupled to said first PM input section output, and a fusion region output, a first intermediate non-PM output and a second intermediate non-PM output both optically coupled to said fusion region output;

a first support structure for securing said fusion region thereto, wherein said first intermediate non-PM output includes a cleaved output near an outer edge of said first support structure to provide a shortened first intermediate non-PM output, and an output section comprising at least a first PM pigtail section having a first PM input optically coupled to said shortened first intermediate non-PM output and an output that provides a first device output for said fused optical coupler device, wherein said first PM pigtail is rotationally aligned to said shortened first intermediate non-PM output to provide a polarization extinction ratio (PER) measured at said first device output of $\geq 20$ dB.

11. The fused optical coupler device of claim 10, further comprising a second support structure, wherein said first support structure and said first PM pigtail section are secured to said second support structure.

12. The fused optical coupler device of claim 10, wherein said first intermediate non-PM output includes a cleaved output near an outer edge of said first support structure to provide a shortened second intermediate non-PM output, further comprising:

a second PM pigtail section having a second PM input optically coupled to said shortened second intermediate non-PM output and an output that provides a second device output for said fused optical coupler device, wherein said second PM pigtail is rotationally aligned to said shortened second intermediate non-PM output to provide a polarization extinction ratio (PER) measured at said second device output of $\geq 20$ dB.

13. The fused optical coupler device of claim 12, wherein said second intermediate non-PM output provides a second device output for said fused optical coupler device.

14. The fused optical coupler device of claim 10, further comprising a second PM input section for said fused optical coupler device for receiving a second polarized signal and a second PM input section output, whereon said second PM input section output is optically coupled to said input of said non-PM fiber comprising fusion region.

15. The fused optical coupler device of claim 10, wherein said fusion region comprises a twisted fusion region.

16. The fused optical coupler device of claim 10, wherein said fusion region comprises a parallel fused fusion region.

17. The fused optical coupler device of claim 10, wherein said first PM input consists of the only input for said fused optical coupler device.

18. The fused optical coupler device of claim 10, further comprising a sealed housing for environmentally sealing at least said fusion region.

19. The fused optical coupler device of claim 10, wherein said at least one input comprises at least three inputs.

20. The fused optical coupler device of claim 10, wherein said output section comprises at least three outputs.

* * * * *